United States Patent
Killadi (10) Patent No.: US 10,904,073 B2
(45) Date of Patent: Jan. 26, 2021

(54) REASSIGN STANDBY USER ANCHOR CONTROLLERS

(71) Applicant: Hewlett Packard Enterprise Development LP, Houston, TX (US)

(72) Inventor: Srinivas Rao Killadi, Bangalore (IN)

(73) Assignee: Hewlett Packard Enterprise Development LP, Houston, TX (US)

(*) Notice: Subject to any disclaimer, the term of this patent is extended or adjusted under 35 U.S.C. 154(b) by 85 days.

(21) Appl. No.: 15/796,737

(22) Filed: Oct. 27, 2017

(65) Prior Publication Data

US 2019/0132192 A1 May 2, 2019

(51) Int. Cl.
*H04L 12/24* (2006.01)
*H04W 80/02* (2009.01)
*H04W 84/12* (2009.01)

(52) U.S. Cl.
CPC ......... *H04L 41/0668* (2013.01); *H04W 80/02* (2013.01); *H04W 84/12* (2013.01)

(58) Field of Classification Search
CPC . H04L 12/1863; H04L 45/16; H04L 41/0668; H04L 12/24; H04W 80/02; H04W 84/12
See application file for complete search history.

(56) References Cited

U.S. PATENT DOCUMENTS

| | | | |
|---|---|---|---|
| 7,411,925 B2 | 8/2008 | Nain et al. | |
| 8,027,248 B2 | 9/2011 | Balasubramanian et al. | |
| 9,456,314 B2 | 9/2016 | Yang et al. | |
| 10,171,361 B1* | 1/2019 | Vytla | H04L 43/08 |
| 2009/0196183 A1* | 8/2009 | Kakadia | H04L 12/145 370/237 |
| 2010/0124163 A1* | 5/2010 | Qiu | H04L 65/1046 370/216 |
| 2013/0142430 A1* | 6/2013 | Okuno | G06K 9/18 382/182 |
| 2015/0312140 A1* | 10/2015 | Yang | H04L 12/18 370/218 |
| 2015/0327024 A1* | 11/2015 | Yang | H04W 48/20 370/312 |
| 2016/0211867 A1* | 7/2016 | Guillemette | H03M 13/1114 |
| 2016/0360407 A1* | 12/2016 | Benoit | H04W 12/003 |
| 2017/0046164 A1* | 2/2017 | Madhavan | G06F 9/30101 |

(Continued)

OTHER PUBLICATIONS

Aruba Networks, "Controller Clustering", (Research Paper), IPv6 IPSec Datapath, Aug. 8, 2017, 8 Pages.

(Continued)

*Primary Examiner* — Syed Ali
(74) *Attorney, Agent, or Firm* — Brooks, Cameron & Huebsch, PLLC (57) ABSTRACT

In some examples, a non-transitory machine-readable storage medium having stored thereon machine-readable instructions to cause a computing processor to track a Layer 2 (L2) bit indicating a L2 connectedness between a first user anchor controller (UAC) corresponding to a client device and a second UAC acting as a standby UAC for the first UAC in a controller cluster, and reassign a third UAC to be the standby UAC for the first UAC in response to the L2 bit indicating that the first UAC is not connected to the second UAC in the same L2 network, wherein the first UAC is in the same L2 network as the third UAC.

14 Claims, 4 Drawing Sheets

(56) References Cited

U.S. PATENT DOCUMENTS

2017/0237654 A1\* 8/2017 Turner ................ H04L 41/0604
370/218
2019/0174344 A1\* 6/2019 Karella ................ H04W 24/10

OTHER PUBLICATIONS

Cisco, "High Availability (SSO) Deployment Guide", (Research Paper), Aug. 6, 2014, 70 Pages.

\* cited by examiner

REASSIGN STANDBY USER ANCHOR CONTROLLERS

BACKGROUND

A controller cluster can be a combination of multiple managed devices working together to provide availability to a number of client devices and provide continuity when a failover occurs. Failover can be a backup operation that automatically switches to a standby system or network if the primary system fails or is temporarily shut down for servicing.

DETAILED DESCRIPTION

Various examples provide for reassigning standby user anchor controllers. In an enterprise WLAN deployment, a first network controller can manage a plurality of access points and store the states of a plurality of client devices that are connected to the plurality of APs that the network controller manages. When a user anchor controller (UAC) is in the WLAN, a second network controller can manage the states of the client devices connected to the plurality of APs. The second network controller (e.g., the UAC) can be different from the first network controller that manages the plurality of APs. If a user anchor controller UAC in the cluster fails, then the client device that is connected to the failed UAC can fail over to a standby UAC in the same cluster. If the standby UAC is Layer 3 (L3) connected to the failed UAC, then the client device may have to de-authenticate and re-authenticate.

Various examples provide for reassigning standby UACs. A UAC cluster can be a combination of multiple managed devices working together to provide availability to a number of clients and provide continuity when a failover occurs. Failover can be a standby operational mode in which the functions of a system component can be assumed by standby system components when a primary component becomes unavailable through either failure or scheduled down time. For example, if a UAC in the cluster fails, the client device that is connected to the failed UAC can fail over to a standby UAC in the same cluster. If the standby UAC is Layer 3 (L3) connected to the failed UAC, then the client device may have to de-authenticate and re-authenticate.

Accordingly, the disclosure is directed to standby UAC reassignment. The standby UAC reassignment disclosed herein may prevent a client device from having to de-authenticate and re-authenticate when a primary UAC becomes unavailable providing intelligent UAC reassignment. For instance, a system suitable for reassigning standby user anchor controllers can include a memory, and a processor to execute executable instructions stored in the memory to track a Layer 2 (L2) bit indicating a L2 connectedness between a first UAC and a second UAC in a controller cluster. The processor can further execute executable instructions stored in the memory to reassign a third UAC to the first UAC based on the L2 bit indicating that the first UAC is not connected to the second UAC in the same L2 network, wherein the first UAC is in a same L2 network as the third UAC.

Figure 1:
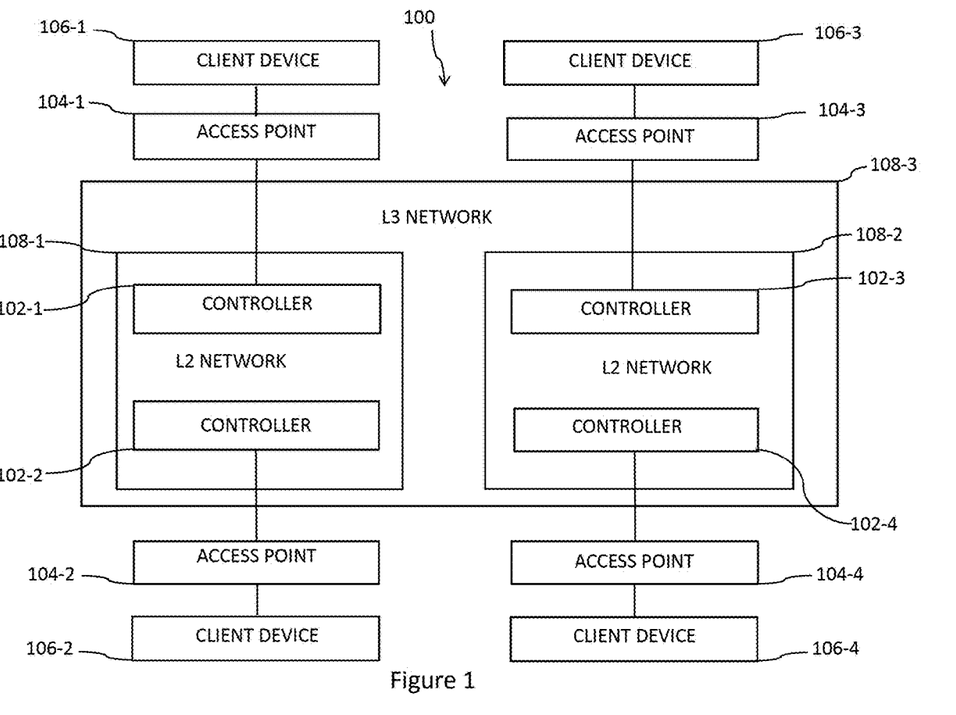
FIG. 1 illustrates an example of a network system suitable with reassigning standby user anchor controllers consistent with the present disclosure.

FIG. 1 illustrates an example network system 100 suitable with reassigning standby user anchor controllers consistent with the present disclosure. UACs 102-1, 102-2 can be a sub cluster of UACs within a first network. For example, the first network can be a first L2 network 108-1. UACs 102-3, 102-4 can be a sub cluster of UACs within a second network. For example, the second network can be a second L2 network 108-2. Sub clusters 108-1 and 108-2 can form a L3 connected cluster 108-3 including UACs 102-1, 102-2, 102-3, 102-4. A cluster of UACs can include a plurality of UACs comprising a network entity managing a number of wireless clients, which involves storing a plurality of states corresponding to each of the wireless clients. When a cluster of UACs includes a plurality of UACs, the UACs can communicate data among each other within the cluster of UACs. The UACs including a cluster of UACs can include UACs of multiple capacities. The terms "wireless client," "client," and "client device" are used interchangeably throughout the disclosure.

In some examples, the UACs can be dedicated to manage wireless clients, e.g., maintaining and tracking client states. In other examples, the network controllers acting as UACs can also manage access points in the network. For example, the AP 104-1 can be assigned to the UAC 102-1, the AP 104-2 can be assigned to the UAC 102-2, the AP 104-3 can be assigned to the UAC 102-3, and the AP 104-4 can be assigned to the UAC 102-4. An AP can include a network device, a type of edge device in particular, that controls access to a network, where the AP may be deployed as a wired access point with wired connectivity with a number of client devices. The AP can also represent additional types of edge devices such as a wireless base station, a cellular base station, or any device set as a hot spot or gateway for network connectivity. The UAC that manages the assigned AP can include the primary UAC of the AP. The assigned AP can remain the primary UAC until an error occurs with the primary UAC. Errors with a UAC can include a failure of the UAC, the UAC being taken offline or possibly when load balancing is performed.

As used herein, an AP can refer to a networking device that allows a client device to connect to a wired or wireless network. The term AP can, for example, refer to receiving points for any known or convenient wireless access technology which may later become known. Specifically, the term AP is not intended to be limited to IEEE 802.11-based APs. APs generally function as an electronic device to allow wireless devices to connect to a wired network via various communication standards. An AP can include a processing resource, memory, and/or input/output interfaces, including wired network interfaces such as IEEE 802.3 Ethernet interfaces, as well as wireless network interfaces such as IEEE 802.11 Wi-Fi interfaces, although examples of the disclosure are not limited to such interfaces. An AP can include a memory resource, including read-write memory, and a hierarchy of persistent memory such as ROM, EPROM, and Flash memory.

An AP may provide access to a wireless network, such as a Wireless Local Area Network (WLAN). As used herein, a WLAN can, for example, refer to a communications network that links two or more devices using some wireless distribution method (for example, spread-spectrum or orthogonal frequency-division multiplexing radio), and usually providing a connection through an AP to the Internet; and thus, providing users with the mobility to move around within a local coverage area and still stay connected to the network.

The client device 106-1 can be assigned to the UAC 102-1, the client device 106-2 can be assigned to the UAC 102-2, the client device 106-3 can be assigned to the UAC 102-3, and the client device 106-4 can be assigned to the UAC 102-2. A client device (also referred to as "client," "wireless client," etc.) can include a stationary network device (e.g., desktop computer, television, set-up box, video gaming console, etc.) or a mobile network device capable of connecting a plurality of wireless networks. An assigned client device can include a client device that has joined a network and has state information stored on a UAC. The UAC that is storing the state information can be the primary UAC of the client device. The network traffic coming from the assigned client device can be transmitted to the primary UAC, but not other UACs within the cluster of UACs, from the AP with which the client device is associated. The assigned client device can remain assigned to the primary UAC until the primary UAC fails, the UAC goes offline, or if load balancing forces the AP to be assigned with a different UAC.

With the client device 106-1 being assigned to the UAC 102-1, the UAC stores the state information of and manages the network traffic of the client device 106-1. Similarly, the UAC 102-2 stores the state information of and manages the network traffic of the client device 106-2, the UAC 102-3 stores the state information of and manages the network traffic of the client device 106-3, and the UAC 102-4 stores the state information of and manages the network traffic of the client device 106-4.

The client device 106-1 can be associated with AP 104-1, the client device 106-2 can be associated with AP 104-2, the client device 106-3 can be associated with AP 104-3, and the client device 106-4 can be associated with AP 104-4. An associated client device can include a client device that has joined the network through an association handshake process according to a wireless standard protocol, for example, by transmitting a probe request to the network, receiving a probe response from an AP in the network, transmitting an association request to the AP, and receiving an association response from the AP in reply.

An associated client device can roam throughout the network and associate with various APs. For example, when the associated client device physically moves to a new location that is outside or near the boundary of the coverage of the AP that the client device is associated with, the client device may disassociate with the AP and complete an association handshake process with a different AP that provides better coverage at the new location.

As described herein, a system can track a L2 bit indicating a L2 connectedness between a first UAC and a second UAC that is currently assigned as a standby UAC for the first UAC in a controller cluster to determine whether a third UAC that is within the same L2 network as the first UAC can be reassigned to the first UAC as a standby UAC. In the event that the first UAC becomes unavailable, a client device can seamlessly be reassigned to and managed by the standby UAC, namely, the third UAC in the same L2 network as the first UAC. A binary bit can have a single binary value, either zero or one. Tracking the L2 bit can include incrementally checking that each index of a bucket map is set to zero or one. A bucket map can be a table that allows an AP to know how to map a client device attempting to associate with the AP to a UAC. A bucket map can include a plurality of bucket indexes, where an index value can be a value that corresponds to a UAC. Seamlessly can include the client device being able to be reassigned to the third UAC without having to de-authenticate and re-authenticate. The third UAC can be on the same L2 network as the first UAC to allow seamless network access to the client device.

For example, if the L2 bit corresponding to UAC 102-1 is set to a value of zero, indicating that the second UAC is not in the same L2 network as UAC 102-1, the system can reassign UAC 102-2 to be the standby UAC for UAC 102-1. UAC 102-1 and UAC 102-2 can be on the same L2 network 108-1, so in response to UAC 102-1 becoming unavailable, client device 106-1 can be reassigned to UAC 102-2 to allow seamless network access to the client device.

In another example, if the L2 bit corresponding to UAC 102-3 is set to a value of zero, the system can reassign UAC 102-4 to be the standby UAC for UAC 102-3. UAC 102-3 and UAC 102-4 can be on the same L2 network 108-2, so in response to UAC 102-3 becoming unavailable, client device 106-3 can be reassigned to UAC 102-4 to allow seamless network access to the client device.

Figure 2:
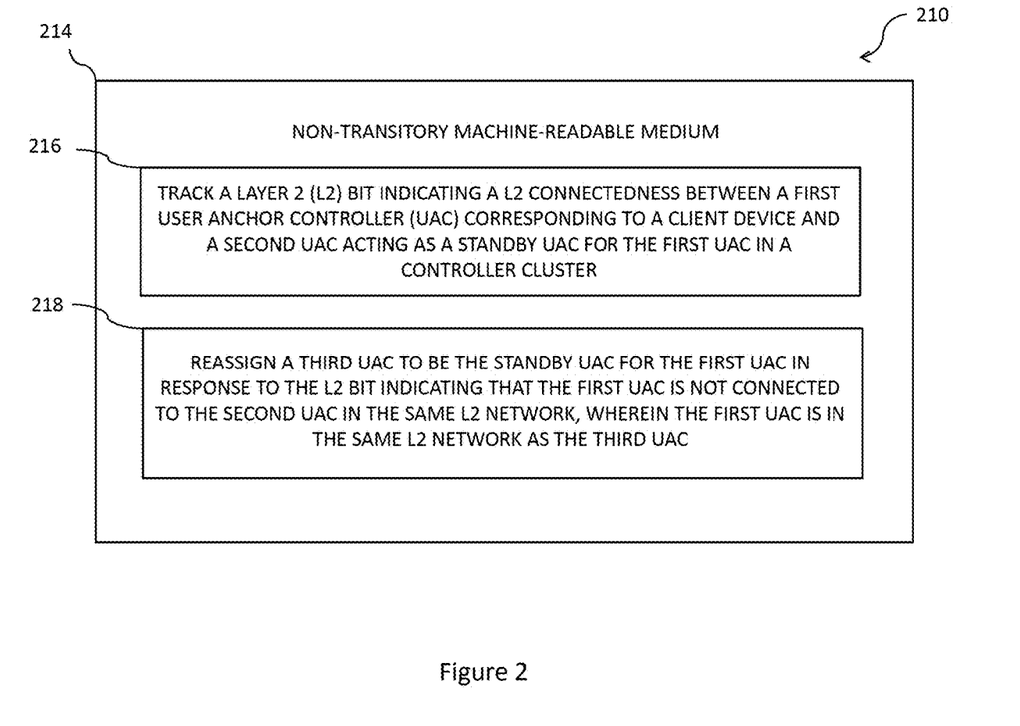
FIG. 2 illustrates an example of a system suitable with reassigning standby user anchor controllers consistent with the present disclosure.

FIG. 2 illustrates an example system 210 suitable with reassigning standby user anchor controllers consistent with the present disclosure. System 210 may include a non-transitory machine readable storage medium 214. Non-transitory machine readable storage medium 214 may be an electronic, magnetic, optical, or other physical storage device that stores executable instructions. Thus, non-transitory machine readable storage medium 214 may be, for example, Random Access Memory (RAM), an Electrically-Erasable Programmable Read-Only Memory (EEPROM), a storage drive, an optical disc, and the like. Non-transitory machine readable storage medium 214 may be disposed within system 210, as shown in FIG. 2. In this example, the executable instructions may be "installed" on the system 210. Additionally and/or alternatively, non-transitory machine readable storage medium 214 may be a portable, external or remote storage medium, for example, that allows system 210 to download the instructions from the portable/external/remote storage medium. In this situation, the executable instructions may be part of an "installation package". As described herein, non-transitory machine readable storage medium 214 may be encoded with executable instructions for a performance threshold.

Instructions 216 may include instructions to track a L2 bit indicating a L2 connectedness between a first UAC corresponding to a client device and a second UAC acting as a standby UAC for the first UAC in a controller cluster. For example, the L2 bit can correspond to a bucket index on an L2 connected bucket map, where the bucket index on the L2 connected bucket map can also correspond to a first UAC which is set on an active bucket map and a second UAC that is set on a standby bucket map. The first UAC and the second UAC can be represented by a predetermined value. For example, a first value can represent a first UAC and a second value can represent a second UAC.

The first UAC can be a primary UAC and the second UAC can be a standby UAC. For example, when a client device joins a network, it can be assigned to a first UAC. The first UAC to which the client device is assigned can be the client device's primary UAC. A primary UAC of a client device can be responsible for handling wireless traffic to/from the client device and storing information for that client device. Each primary UAC is also assigned a standby UAC, which acts as the primary UAC for the client device in the event that the primary UAC is unavailable. Specifically, a client device can be reassigned to the standby UAC if the primary UAC becomes unavailable and the standby UAC can become responsible for handling wireless traffic to/from the client device and storing information for that client device.

Tracking the L2 bit can include monitoring a number of bucket maps. For example, the number of bucket maps can include a L2 connected bucket map, a standby bucket map, and/or an active bucket map, among other types of bucket maps. The L2 connected bucket map, the standby bucket map, and the active bucket map can be used to determine the primary UAC and the standby UAC that a client device is assigned to. For example, the active bucket map can include a value that can represent the UAC that is set as the primary UAC for each client device. The standby bucket map can include a value that can represent the UAC that is assigned to the primary UAC and is the standby UAC set for each client device. The L2 connected bucket map can include an L2 bit that can indicate whether the primary UAC and the first standby UAC for each client device are on the same L2 network. The L2 network may include adjacent network nodes or network nodes within a same network segment that are reachable via a data link protocol without routing.

Tracking the L2 bit can include incrementally checking a bucket map to determine that the L2 bit indicates the first UAC is not connected to the second UAC in the same L2 network. For example, the bucket map can be an L2 connected bucket map. Incrementally checking an L2 connected bucket map can include checking that each L2 bit that corresponds to a bucket index is set to a value of zero or a value of one. If the L2 bit is set to a value of one, the system 210 can implement the bucket index that corresponds to that L2 bit without reassigning a second standby UAC to the primary UAC. The system 210 can implement the bucket index because the client device is already assigned to a primary UAC that has a first standby UAC that is in the same L2 network, which allows the client device to seamlessly be reassigned to the first standby UAC if the primary UAC becomes unavailable. If the L2 bit is set to a value of zero, the system 210 can reassign a second standby UAC to the primary UAC which is L2 connected to the primary UAC. Reassigning a second standby UAC can include reassigning a third UAC to assume the functions of the originally assigned primary UAC.

Instructions 218 may include instructions to reassign a third UAC to be the standby UAC for the first UAC in response to the L2 bit indicating that the first UAC is not connected to the second UAC in the same L2 network, wherein the first UAC is in the same L2 network as the third UAC. As described herein, the first UAC can be the primary UAC, the second UAC can be the first standby UAC, and the third UAC can be the second standby UAC. When assigning the second standby UAC to the primary UAC, the current L2 network of the primary UAC can be considered. The system 210 can determine whether there is a standby UAC in the same L2 network to reassign to the primary UAC. If there is a second standby UAC in the same L2 network as the primary UAC, the second standby UAC can be reassigned to the primary UAC, so that the second standby UAC can seamlessly provide network access to the client device. Additionally, the primary UAC and the second standby UAC can be on the same L3 layer of a network and operate in a mixed mode cluster. A mixed mode cluster can support a L2 layer and a L3 layer.

Reassigning a third UAC to be the standby UAC for the first UAC can include setting the value that corresponds to the bucket index on the standby bucket map to the value that represents a second standby UAC that is in the same L2 network that the primary UAC is in. For example, if bucket index 0 of the L2 connected bucket map indicates that the L2 bit is set to a value of zero, the value that corresponds to bucket index 0 on the standby bucket map can be changed to the value that represents the second standby UAC that is in the same L2 network as the primary UAC.

Determining which UAC is assigned to be the standby UAC for the primary UAC can be made by multiple sources. For example, the primary UAC can make the determination as to which UAC becomes the standby UAC. Further, a managing UAC of the cluster of UACs can make the determination as to which UAC should become the standby UAC. Further, a Software-Defined Networks (SDN) application can make the determination as to which UAC should become the standby UAC.

If the system 210 determines that there is not a second standby UAC in the same L2 network to reassign to the primary UAC, the system 210 can reassign a second bucket index's standby UAC to free up the load on the L2 network before reassigning a second standby UAC to the primary UAC.

Reassigning the second standby UAC to the primary UAC before the primary UAC becomes unavailable can result in full user stateful switch over (SSO). For example, responsive to the primary UAC becoming unavailable, a device can seamlessly be reassigned to the second standby UAC. The second standby UAC can be on the same L2 network as the primary UAC, so the device may not have to de-authenticate and re-authenticate.

Figure 3:
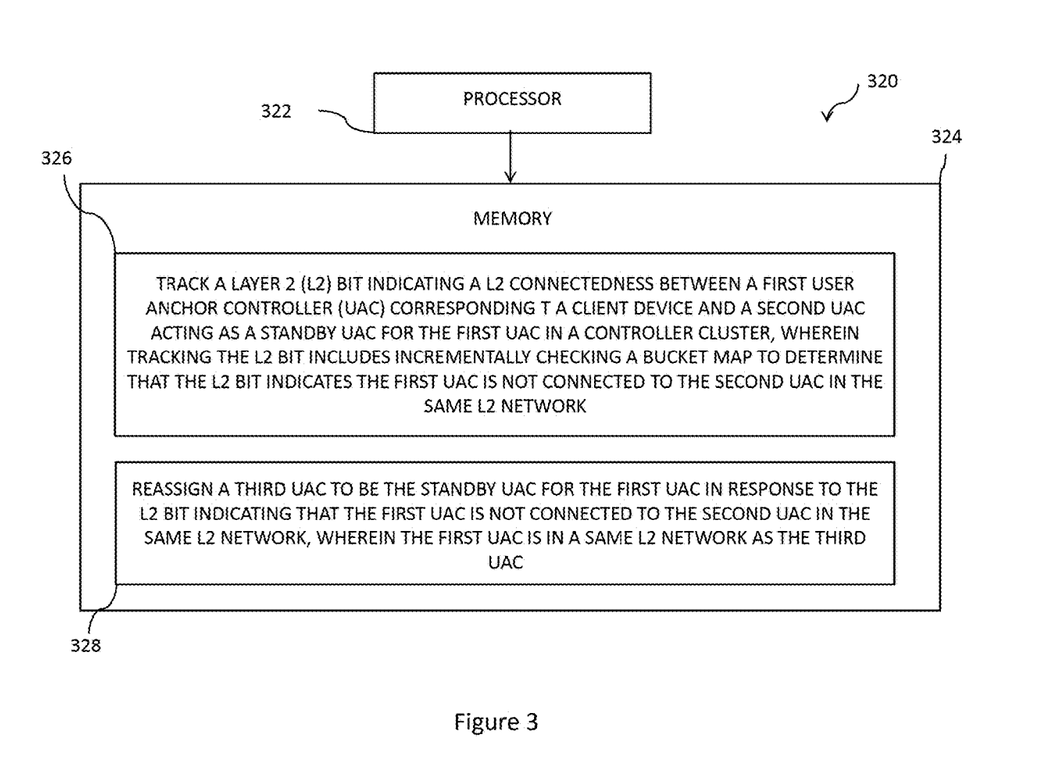
FIG. 3 illustrates an example of a system suitable with reassigning standby user anchor controllers consistent with the present disclosure.

FIG. 3 illustrates an example of a system 320 suitable with reassigning standby user anchor controllers consistent with the present disclosure.

As illustrated in FIG. 3, the system 320 can include a processing resource 322 coupled to the memory resource 324, on which instructions may be stored, such as instructions 326 and 328. Although the following descriptions refer to an individual processing resource and an individual memory resource, the descriptions may also apply to a system with multiple processing resources and multiple memory resources. In such examples, the instructions may be distributed (e.g., stored) across multiple processing resources.

Processing resource 322 may be a central processing unit (CPU), a semiconductor based microprocessor, and/or other hardware devices suitable for retrieval and execution of instructions stored in memory resource 324. Processing resource 322 may fetch, decode, and execute instructions 326 and 328, or a combination thereof. As an alternative or in addition to retrieving and executing instructions, processing resource 322 may include an electronic circuit that includes electronic components for performing the functionality of instructions 326 and 328, or combination thereof.

Memory resource 324 can be volatile or nonvolatile memory. Memory resource 324 can be removable (e.g., portable) memory, or non-removable (e.g., internal) memory. For example, memory resource 324 can be random access memory (RAM) (e.g., dynamic random access memory (DRAM) and/or phase change random access memory (PCRAM)), read-only memory (ROM) (e.g., electronically erasable programmable read-only memory (EEPROM) and/or compact-disk read-only memory (CR-ROM), flash memory, a laser disc, a digital versatile disk (DVD) or other optical disk storage, and/or a magnetic medium such as magnetic cassettes, tapes, or disks, among other types of memory.

Instructions 326, when executed by processing resource 322, can cause memory resource 324 to track a L2 bit indicating a L2 connectedness between a first UAC corresponding t a client device and a second UAC acting as a standby UAC for the first UAC in a controller cluster, wherein tracking the L2 bit includes incrementally checking a bucket map to determine that the L2 bit indicates the first UAC is not connected to the second UAC in the same L2 network. As described herein, the L2 bit can correspond to a bucket index on an L2 connected bucket map, where the bucket index on the L2 connected bucket map can also correspond to a primary UAC which is set on an active bucket map and a standby UAC that is set on a standby bucket map. The primary UAC and the standby UAC can be represented by a predetermined value. For example, a first value can represent a primary UAC and a second value can represent a standby UAC.

As described herein, tracking the L2 bit can include monitoring an L2 connected bucket map, a standby bucket map, and/or an active bucket map, among other types of bucket maps. For example, the active bucket map can include a value that can represent the UAC that is set as the primary UAC for the client device. The standby bucket map can include a value that can represent the UAC that is assigned to the primary UAC and is the standby UAC set for the client device. The L2 connected bucket map can include an L2 bit that can indicate whether the primary UAC and the standby UAC are on the same L2 network. An L2 network can include a plurality of UACs which can operate as a single entity. Generally, entities within the same L2 network can communicate with each other using a data link layer protocol that transfers data between adjacent network nodes or between nodes on network segment. Traffic to different L2 networks would need to be routed.

As described herein, tracking the L2 bit can include incrementally checking the L2 connected bucket map. Incrementally checking the L2 connected bucket map can include checking that each L2 bit that corresponds to a bucket index is set to a value of zero or a value of one. If the L2 bit is set to a value of one, the system can implement the bucket index that corresponds to that L2 bit without reassigning a second standby UAC to the primary UAC. If the L2 bit is set to a value of zero, the system can reassign a second standby UAC to the primary UAC which is L2 connected for seamless network connectivity to the client device on a failover event.

Instructions 328, when executed by processing resource 322, can cause memory resource 324 to reassign a third UAC to be the standby UAC for the first UAC in response to the L2 bit indicating that the first UAC is not connected to the second UAC in the same L2 network, wherein the first UAC is in a same L2 network as the third UAC. As described herein, the first UAC can be the primary UAC, the second UAC can be the first standby UAC, and the third UAC can be the second standby UAC. If there is a second standby UAC in the same L2 network as the primary UAC, the second standby UAC can be reassigned to the primary UAC, so that the second standby UAC can provide seamless network access to the client device.

Reassigning a second standby UAC to the primary UAC can include setting the value that corresponds to the bucket index on the standby bucket map to the value that represents a UAC that is in the same L2 network that the primary UAC is in. For example, if bucket index 0 of the L2 connected bucket map indicates that the L2 bit is set to a value of zero, the value that corresponds to bucket index 0 on the standby bucket map can be changed to the value that represents the second standby UAC that is in the same L2 network as the primary UAC.

If the system determines that there is not a second standby UAC in the same L2 network to reassign to the primary UAC, the system can reassign a second bucket index's standby UAC to free up the load on the L2 network before reassigning a second standby UAC to the primary UAC.

As described herein, assigning the second standby UAC to the primary UAC before the primary UAC becomes unavailable can result in full user SSO. For example, responsive to the primary UAC becoming unavailable, a device can be reassigned to the second standby UAC. The second standby UAC can be on the same L2 network as the primary UAC, so the client device can have seamless access to the network.

Figure 4:
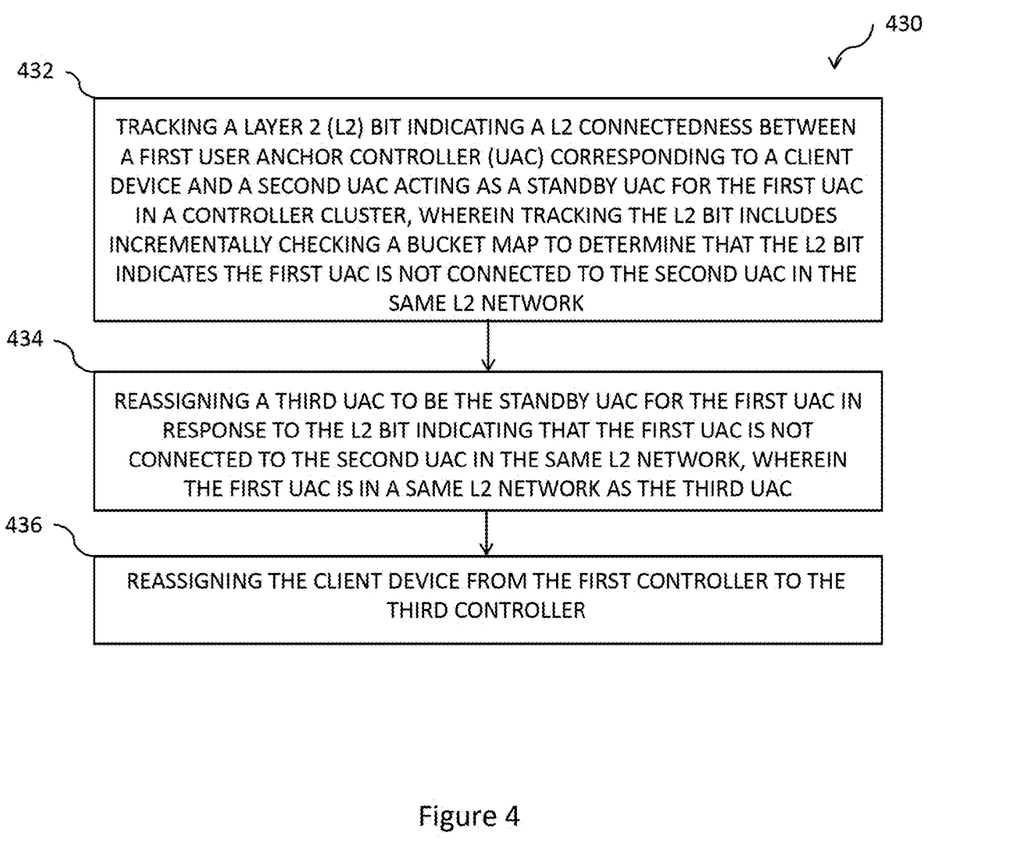
FIG. 4 illustrates an example of a method for reassigning standby user anchor controllers consistent with the present disclosure.

FIG. 4 illustrates an example of method 430 of reassigning standby user anchor controllers consistent with the present disclosure.

As described herein, at 432, the method 430 can include tracking a L2 bit indicating a L2 connectedness between a first UAC corresponding to a client device and a second UAC acting as a standby UAC for the first UAC in a controller cluster. For example, tracking the L2 bit can include incrementally checking a bucket map to determine that the L2 bit indicating the first UAC is not connected to the second UAC in the same L2 network. The bucket map can be an L2 connected bucket map. The L2 bit can correspond to a bucket index on the L2 connected bucket map, where the bucket index on the L2 connected bucket map can also correspond to a primary UAC which is set on an active bucket map and a standby UAC that is set on a standby bucket map.

As described herein, incrementally checking an L2 connected bucket map can include checking that each L2 bit that corresponds to a bucket index is set to a value of zero or a value of one. If the L2 bit is set to a value of one, the system can implement the bucket index that corresponds to that L2 bit without reassigning a second standby UAC to the primary UAC. If the L2 bit is set to a value of zero, the system 210 can reassign a second standby UAC to the primary UAC which is L2 connected for seamless network connectivity to the client device on a failover event.

As described herein, at 434, the method 430 can include reassigning a third UAC to be the standby UAC for the first UAC in response to the L2 bit indicating that the first UAC is not connected to the second UAC in the same L2 network, wherein the first UAC is in a same L2 network as the third UAC. The first UAC can be the primary UAC, the second UAC can be the first standby UAC, and the third UAC can be the second standby UAC. When reassigning the second standby UAC to the primary UAC, the current L2 network of the primary UAC can be considered. The system can determine whether there is a second standby UAC in the same L2 network to reassign to the primary UAC. If there is a second standby UAC in the same L2 network as the primary UAC, the second standby UAC can be reassigned to the primary UAC, so that the second standby UAC can provide seamless network connectivity to the client device.

If there is not a second standby UAC in the same L2 network to reassign to the primary UAC, the system can reassign a second bucket index's standby UAC to free up the load on the L2 network before assigning a second standby UAC to the primary UAC.

As described herein, at 436, the method 430 can include reassigning the client device from the first UAC to the second UAC. For example, in response to the primary UAC becoming unavailable and the second standby UAC being on the same L2 network as the primary UAC, a client device can seamlessly be reassigned to the standby UAC.

In the foregoing detailed description of the disclosure, reference is made to the accompanying drawings that form a part hereof, and in which is shown by way of illustration how examples of the disclosure may be practiced. These examples are described in sufficient detail to allow those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the disclosure. In addition, the proportion and the relative scale of the elements provided in the figures are intended to illustrate the examples of the disclosure, and should not be taken in a limiting sense.

What is claimed:

1. A non-transitory machine-readable storage medium having stored thereon machine-readable instructions to cause a computing processor of a device to:
   track a Layer 2 (L2) bit indicating a L2 connectedness between a first user anchor controller (UAC), comprising a primary UAC, and a second UAC, comprising a first standby UAC, in a controller cluster by monitoring a L2 connected bucket map, a standby bucket map and an active bucket map, wherein the active bucket map indicates the first UAC that is set as the primary UAC for each client device, the active bucket map including a first value representing the first UAC, the standby bucket map indicates the first UAC that is assigned to be the primary UAC and the second UAC that is assigned to be a first standby UAC for each client device, the standby bucket map including a second value representing the first standby UAC, and the L2 connected bucket map indicates whether the primary UAC and the first standby UAC for each client device are on the same L2 network, and the L2 bit is a single binary value of either zero or one;
   reassign a third UAC, the third UAC comprising a second standby UAC, to the first UAC based on the L2 bit corresponding to the value of zero indicating that the first UAC is not connected to the second UAC in the same L2 network, wherein the first UAC is in the same L2 network as the third UAC; and
   omit reassigning a third UAC to the first UAC based on the L2 bit corresponding to the value of one indicating that the first UAC is connected to the second UAC in the same L2 network.

2. The medium of claim 1, wherein responsive to the primary UAC becoming unavailable, a device is reassigned to the second standby UAC.

3. The medium of claim 1, wherein tracking the L2 bit includes monitoring the active bucket map and the standby bucket map and incrementally checking a L2 connected bucket map that includes the L2 bit to determine that the L2 bit indicates the primary UAC is not connected to the first standby UAC in the same L2 network and to reassign the second standby UAC to the primary UAC.

4. The medium of claim 3, wherein L2 connected bucket map includes a bucket index that corresponds to the primary UAC and the first standby UAC; and wherein the bucket index is implemented or the second standby UAC is reassigned depending on the single binary value of the L2 bit.

5. A system comprising:
   a processing resource; and
   a memory resource storing machine-readable instructions to cause the processing resource to:
   track a Layer 2 (L2) bit indicating a L2 connectedness between a first user anchor controller (UAC), comprising a primary UAC, and a second UAC, comprising a first standby UAC, in a controller cluster, wherein the first UAC is set on an active bucket map as the primary UAC which includes a first value that represents the first UAC, and the second UAC is set on a standby bucket map which includes a second value that represents the second UAC, and wherein tracking the L2 bit includes monitoring the active bucket map and the standby bucket map and incrementally checking an L2 connected bucket map that includes the L2 bit to determine that the L2 bit indicates the first UAC is not connected to the second UAC in the same L2 network, further wherein the active bucket map indicates a UAC that is set as a primary UAC for each client device, the standby bucket map indicates a UAC that is assigned to primary UAC and a UAC that is assigned to be a standby UAC for each client device, the L2 connected bucket map indicates whether the primary UAC and the first standby UAC for each client device are on the same L2 network;
   reassign a third UAC, which is set on the standby bucket map, the third UAC comprising a second standby UAC to the first UAC based on the L2 bit corresponding to a first single binary value indicating that the first UAC is not connected to the second UAC in the same L2 network, wherein the first UAC is in a same L2 network as the third UAC; and
   omit reassigning a third UAC to the first UAC based on the L2 bit corresponding to a second single binary value indicating that the first UAC is connected to the second UAC in the same L2 network.

6. The system of claim 5, wherein first UAC and the third UAC operate as a single entity.

7. The system of claim 5, wherein the L2 connected bucket map includes a bucket index that corresponds to the first UAC and the second UAC; and wherein the bucket index is implemented or the third UAC is reassigned depending on a value of the L2 bit.

8. The system of claim 7, wherein the L2 bit is a single binary value of either zero or one, wherein the value of zero corresponds to the first single binary value and the value of one corresponds to the second single binary value.

9. The system of claim 5, wherein the first, second, and third controller operate in a mixed mode cluster.

10. A method comprising:
    tracking a Layer 2 (L2) bit indicating a L2 connectedness between a first user anchor controller (UAC), comprising a primary UAC, and a second UAC, comprising a first standby UAC, in a controller cluster, wherein the first UAC is set on an active bucket map, and the second UAC is set on a standby bucket map, and wherein tracking the L2 bit includes monitoring the active bucket map and the standby bucket map and incrementally checking a L2 connected bucket map that includes the L2 bit to determine that the L2 bit indicates the first UAC is not connected to the second UAC in the same L2 network, further wherein the active bucket map indicates the first UAC that is set as the primary UAC for each client device, the active bucket map including a first value representing the first UAC, the standby bucket map indicates the first UAC that is assigned to the primary UAC and the second UAC that is assigned to be the first standby UAC for each client device, the standby bucket map including a second value representing the first standby UAC, and the L2 connected bucket map indicates whether the primary UAC and the first standby UAC for each client device are on the same L2 network;

reassigning a third UAC, the third UAC comprising a second standby UAC, which is set on the standby bucket map, to the first UAC based on the L2 bit corresponding to a first single binary value corresponding to a value of zero indicating that the first UAC is not connected to the second UAC in the same L2 network, wherein the first UAC is in a same L2 network as the third UAC; and reassigning a client device from the first UAC to the third UAC; and omit reassigning a third UAC to the first UAC based on the L2 bit corresponding to a second single binary value corresponding to a value of one indicating that the first UAC is connected to the second UAC in the same L2 network; and omit reassigning a client device from the first UAC to the third UAC.

11. The method of claim 10, further comprising:
a first bucket index, included on the L2 connected bucket map and corresponding to the first UAC and the second UAC, is implemented in response to the L2 bit being a value of one; and
a second bucket index, included on the L2 connected bucket map and corresponding to the first UAC and the third UAC, is implemented in response to the L2 bit being a value of zero.

12. The method of claim 10, wherein the client device is reassigned from the first UAC to the third UAC seamlessly in response to first UAC being on the same L2 network as the third UAC.

13. The method of claim 10, wherein reassigning the third UAC to the first UAC includes determining whether the third UAC is available on the same L2 network as the first UAC.

14. The method of claim 10, wherein reassigning the third UAC to the first UAC includes reassigning a second bucket index's standby controller.

* * * * *